United States Patent
Low et al.

(10) Patent No.: US 11,537,756 B2
(45) Date of Patent: Dec. 27, 2022

(54) SYSTEMS AND METHODS FOR PROVIDING SURROGATE CREDENTIALS AND A SECURE GUEST MODE FOR MOBILE DEVICES

(71) Applicant: Verizon Patent and Licensing Inc., Basking Ridge, NJ (US)

(72) Inventors: Mun Wei Low, Irving, TX (US); Dante J. Pacella, Charles Town, WV (US); Tanisha Sharma, Los Angeles, CA (US); Eric T. Bax, Sierra Madre, CA (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 17/101,843

(22) Filed: Nov. 23, 2020

(65) Prior Publication Data

US 2022/0164484 A1 May 26, 2022

(51) Int. Cl.
*G06F 21/75* (2013.01)
*H04W 4/90* (2018.01)
*G06F 21/31* (2013.01)

(52) U.S. Cl.
CPC .............. *G06F 21/75* (2013.01); *G06F 21/31* (2013.01); *H04W 4/90* (2018.02)

(58) Field of Classification Search
CPC ........... G06F 21/75; G06F 21/31; H04W 4/90
See application file for complete search history.

(56) References Cited

U.S. PATENT DOCUMENTS

| | | | | |
|---|---|---|---|---|
| 7,822,406 B2 * | 10/2010 | Lee | ...................... | H04W 12/065 726/28 |
| 8,942,673 B2 * | 1/2015 | Forte | ................... | H04W 12/068 455/414.1 |
| 9,977,561 B2 * | 5/2018 | Bates | .................... | G11B 27/105 |
| 10,263,990 B2 * | 4/2019 | Son | ...................... | H04L 41/0883 |
| 10,575,164 B1 * | 2/2020 | Makhlouf | ............... | H04W 4/90 |
| 11,030,120 B2 * | 6/2021 | Zmudzinski | ........ | G06F 12/0882 |
| 2014/0325597 A1 * | 10/2014 | Ore | ........................ | H04W 60/00 726/3 |
| 2017/0011210 A1 * | 1/2017 | Cheong | .................. | A61B 5/681 |
| 2017/0019394 A1 * | 1/2017 | Yastrebenetsky | ........................... | H04N 21/4627 |
| 2017/0242721 A1 * | 8/2017 | Tsirkin | .................. | G06F 9/4812 |
| 2020/0389460 A1 * | 12/2020 | Carbune | ............... | H04L 63/102 |
| 2022/0030419 A1 * | 1/2022 | Lourembam | ........... | H04W 4/70 |

\* cited by examiner

*Primary Examiner* — Viral S Lakhia

(57) ABSTRACT

A user device may invoke, for a user associated with an unavailable user device, a guest mode, and may connect the user device with a network device based on invoking the guest mode. The user device may provide credentials of the user and a secure input of the user to the network device based on invoking the guest mode, and may receive an identity service and an emergency service for the user when the secure input is authenticated by the network device. The user device may associate, via the identity service, the user with the user device to enable the user to utilize the emergency service, and may provide, via the emergency service, one or more emergency notifications. The user device may receive an indication of the user exiting the guest mode, and may remove the credentials of the user from a memory based on the indication.

20 Claims, 10 Drawing Sheets

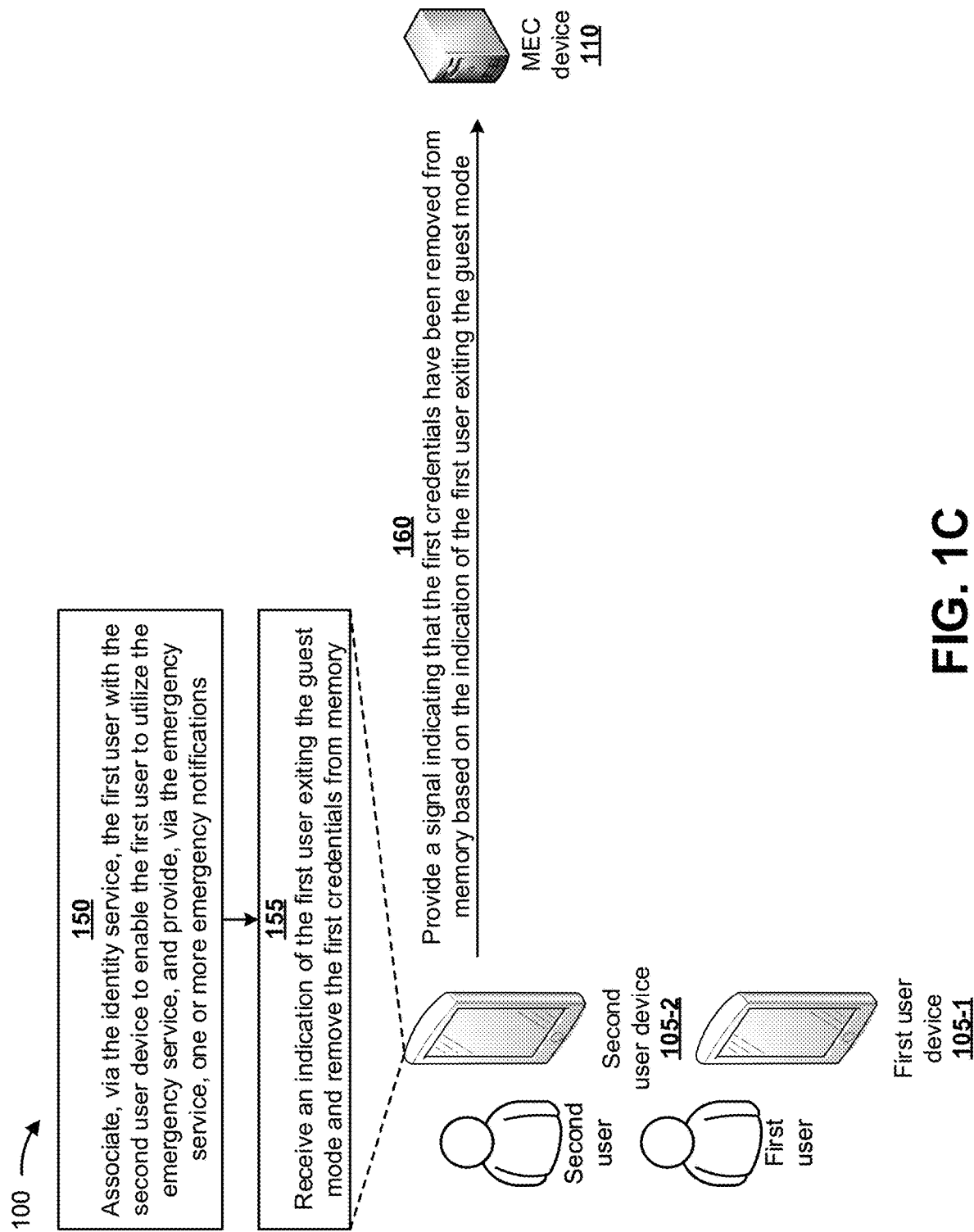

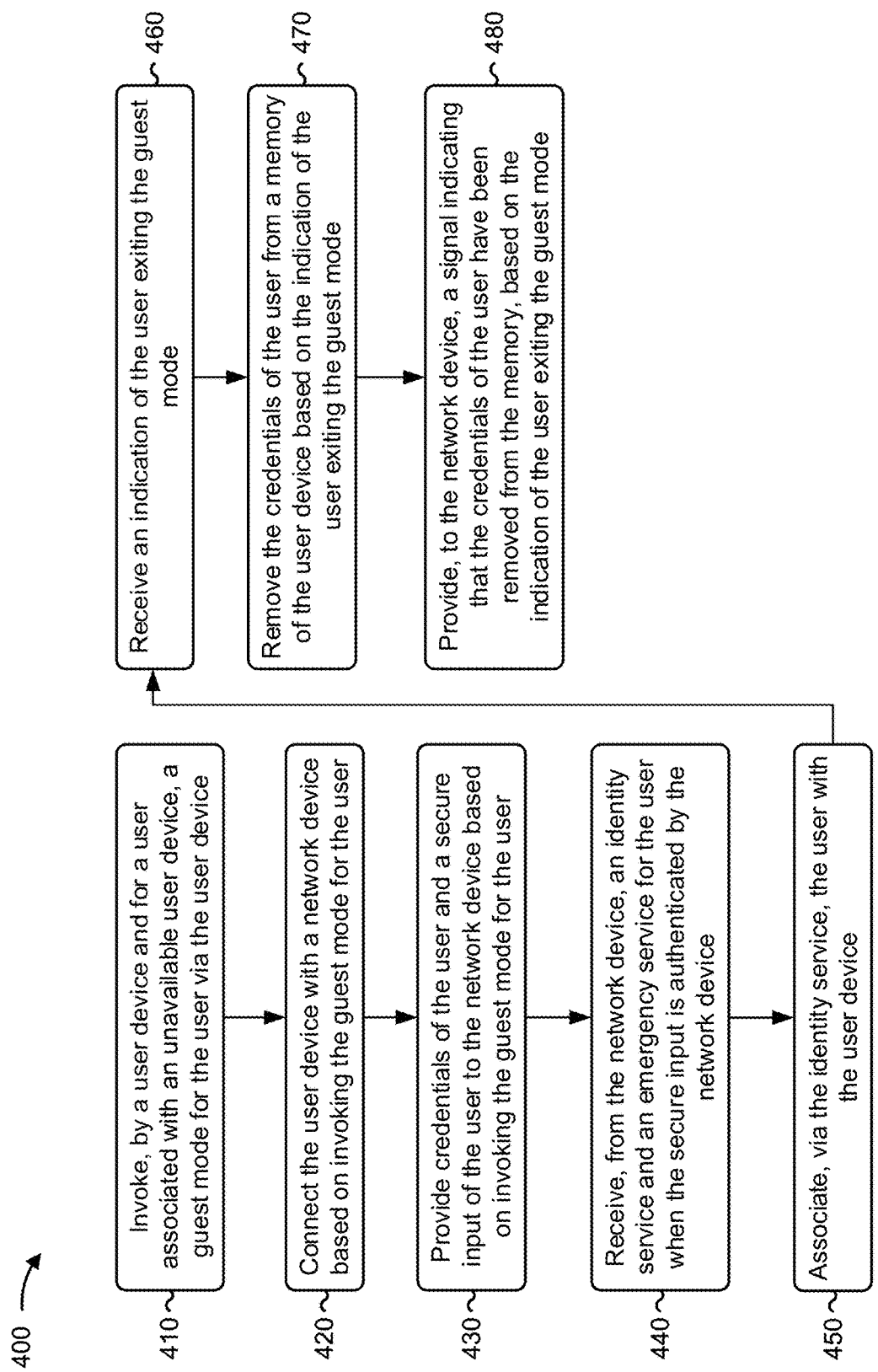

SYSTEMS AND METHODS FOR PROVIDING SURROGATE CREDENTIALS AND A SECURE GUEST MODE FOR MOBILE DEVICES

BACKGROUND

As digital identities get further integrated with mobile user devices, there is an increased risk that digital identities may be unavailable if the user devices are unavailable (e.g., due user device damage, during emergency situations, and/or the like).

BRIEF DESCRIPTION OF THE DRAWINGS

FIGS. 1A-1G are diagrams of one or more example implementations described herein.

FIG. 4 is a flow chart of an example process for providing surrogate credentials and a secure guest mode for mobile devices.

DETAILED DESCRIPTION OF PREFERRED EMBODIMENTS

Figure 1A:
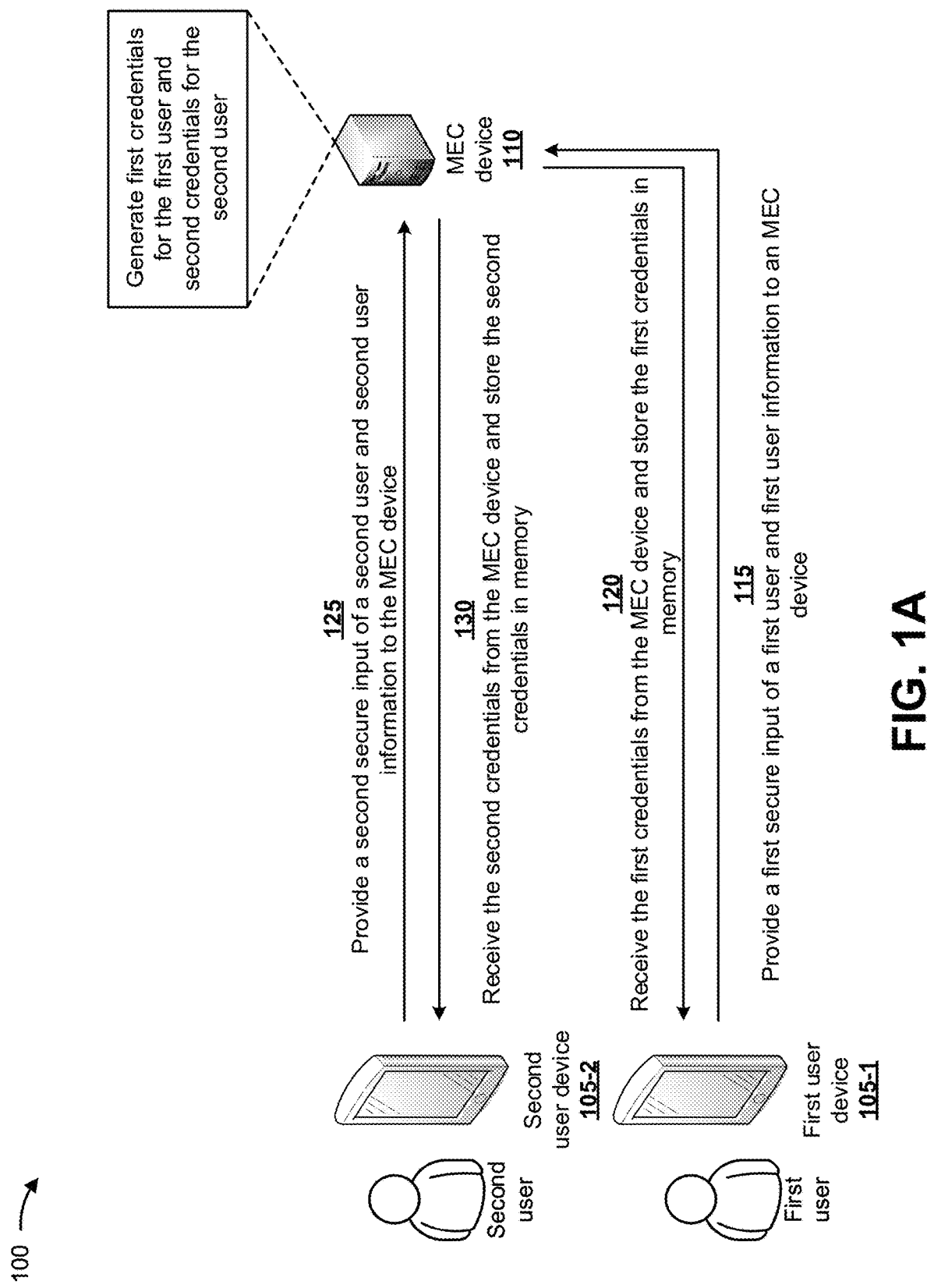

The following detailed description of example implementations refers to the accompanying drawings. The same reference numbers in different drawings may identify the same or similar elements.

In a time of crisis, someone may not be able to access their personal devices and may need to utilize somebody else's device. For example, in an emergency or disaster scenario (e.g., a hurricane, an earthquake, and/or the like), someone may be unable to access their mobile device (e.g., a mobile phone, tablet, or laptop). The mobile device may be damaged, lost, stolen, inactive, and/or the like and the user of the mobile device may have previously relied on the mobile device to store or control identifying/purchase authorizing information services. Another person may possess another mobile device that is available. However, the user is unable to utilize the other mobile device to securely access the services of the user. Additionally, the other person (e.g., emergency personnel) may need to verify an identity of the user who cannot fully communicate with them. For example, an emergency medical technician (EMT) may need to treat the user (e.g., of the mobile device) that is incapacitated, incoherent, or unable to properly communicate. However, the EMT is unable to utilize the user's mobile device. The user's mobile device may function and may include identity services and emergency precautions (e.g., medications, a medical record, and/or the like) associated with the user. This, in turn, puts lives in danger and wastes computing resources (e.g., processing resources, memory resources, communication resources, and/or the like), networking resources, and/or the like associated with determining identities and emergency precautions of users during emergency situations, locating missing users during disaster situations, and/or the like.

Some implementations described herein provide systems and/or methods for providing surrogate credentials and a secure guest mode for mobile devices. For example, a user device may invoke, for a user associated with an unavailable user device, a guest mode for the user via the user device, and may connect the user device with a network device based on invoking the guest mode for the user. The user device may provide credentials of the user and a secure input of the user to the network device based on invoking the guest mode for the user, and may receive, from the network device, an identity service and an emergency service for the user when the secure input is authenticated by the network device. The user device may associate, via the identity service, the user with the user device to enable the user to utilize the emergency service, and may provide, via the emergency service, one or more emergency notifications. The user device may receive an indication of the user exiting the guest mode, and may remove the credentials of the user from a memory (e.g., a secure memory element) of the user device based on the indication of the user exiting the guest mode.

In this way, the systems and/or methods described herein may enable a secure guest mode on a user device to convey surrogate credentials so that a user may receive identity services and/or emergency services. Surrogate credentialing may include when a user interacts with credentials through another's user device. The credentials may be securely shared through a secure element of the other user device. The guest mode may be used for search and rescue (e.g., to locate a user), to provide vital signs (e.g., a heart rate, a body temperature, a pulse, and/or the like) that indicate the user's physical condition (e.g., to an emergency contacts list), for emergency personnel to access identity services and/or emergency precautions associated with an unresponsive person, and/or the like. The guest mode may be utilized when another user device is unavailable, such as when the other user device is lost, damaged, has a dead battery, is stolen, and/or the like and the user needs to make a purchase, authorize a transaction, send a message or the like. This, in turn, potentially saves time during an emergency for users and EMTs, saves lives that are in danger, and conserves computing resources, networking resources, and/or the like that would otherwise have been wasted in determining identities and emergency precautions of users during emergency situations, locating missing users during disaster situations, and/or the like.

FIGS. 1A-1G are diagrams of one or more example implementations 100 associated with providing surrogate credentials and a secure guest mode for mobile devices. As shown in FIGS. 1A-1G, example implementations 100 include a first user device 105-1, a second user device 105-2, and a multi-access edge computing (MEC) device 110. User devices 105 may include mobile phones, laptop computers, tablet computers, wearable devices, and/or the like. MEC device 110 may include a device that authenticates user and surrogate credentials and enables a secure guest mode for user devices 105.

In some implementations, MEC device 110 may establish guest mode credentials, separate from credentials of the first user and the second user. The guest mode credentials may be unique to a session device (e.g., first user device 105-1 or second user device 105-2) to orchestrator pairing. The guest mode credentials may be established so that first user device 105-1 or second user device 105-2 may securely receive user credentials in a secure environment on a potentially untrusted user device so that the user device does not retain the user credentials.

As shown in FIG. 1A, and by reference number 115, the first user device 105-1 may provide a first secure input of a first user and first user information to MEC device 110. The first secure input may include a personal identification number (PIN), a password, a biometric input (e.g., a fingerprint), and/or the like associated with the first user of the first user device 105-1. The first user information may include a name of the first user, a postal address of the first user, an email address of the first user, financial information of the first user, and/or the like. MEC device 110 may receive the first secure input and the first user information, and may generate first credentials for the first user based on the first secure input and the first user information.

As further shown in FIG. 1A, and by reference number 120, the first user device 105-1 may receive the first credentials from MEC device 110 and may store the first credentials in memory (e.g., a secure memory element) associated with the first user device 105-1. The first credentials may include a username associated with the first user, a telephone number associated with the first user device 105-1, an account number associated with the first user, and/or the like. In some implementations, the first secure input and the first credentials may be utilized by the first user to access a guest mode on a user device 105 other than the first user device 105-1.

As further shown in FIG. 1A, and by reference number 125, the second user device 105-2 may provide a second secure input of a second user and second user information to MEC device 110. The second secure input may include a PIN, a password, a biometric input, and/or the like associated with the second user of the second user device 105-2. The second user information may include a name of the second user, a postal address of the second user, an email address of the second user, financial information of the second user, and/or the like. MEC device 110 may receive the second secure input and the second user information, and may generate second credentials for the second user based on the second secure input and the second user information.

As further shown in FIG. 1A, and by reference number 130, the second user device 105-2 may receive the second credentials from MEC device 110 and may store the second credentials in a memory associated with the second user device 105-2. The second credentials may include a username associated with the second user, a telephone number associated with the second user device 105-2, an account number associated with the second user, and/or the like. In some implementations, the second secure input and the second credentials may be utilized by the second user to access a guest mode on a user device 105 other than the second user device 105-2.

Figure 1B:
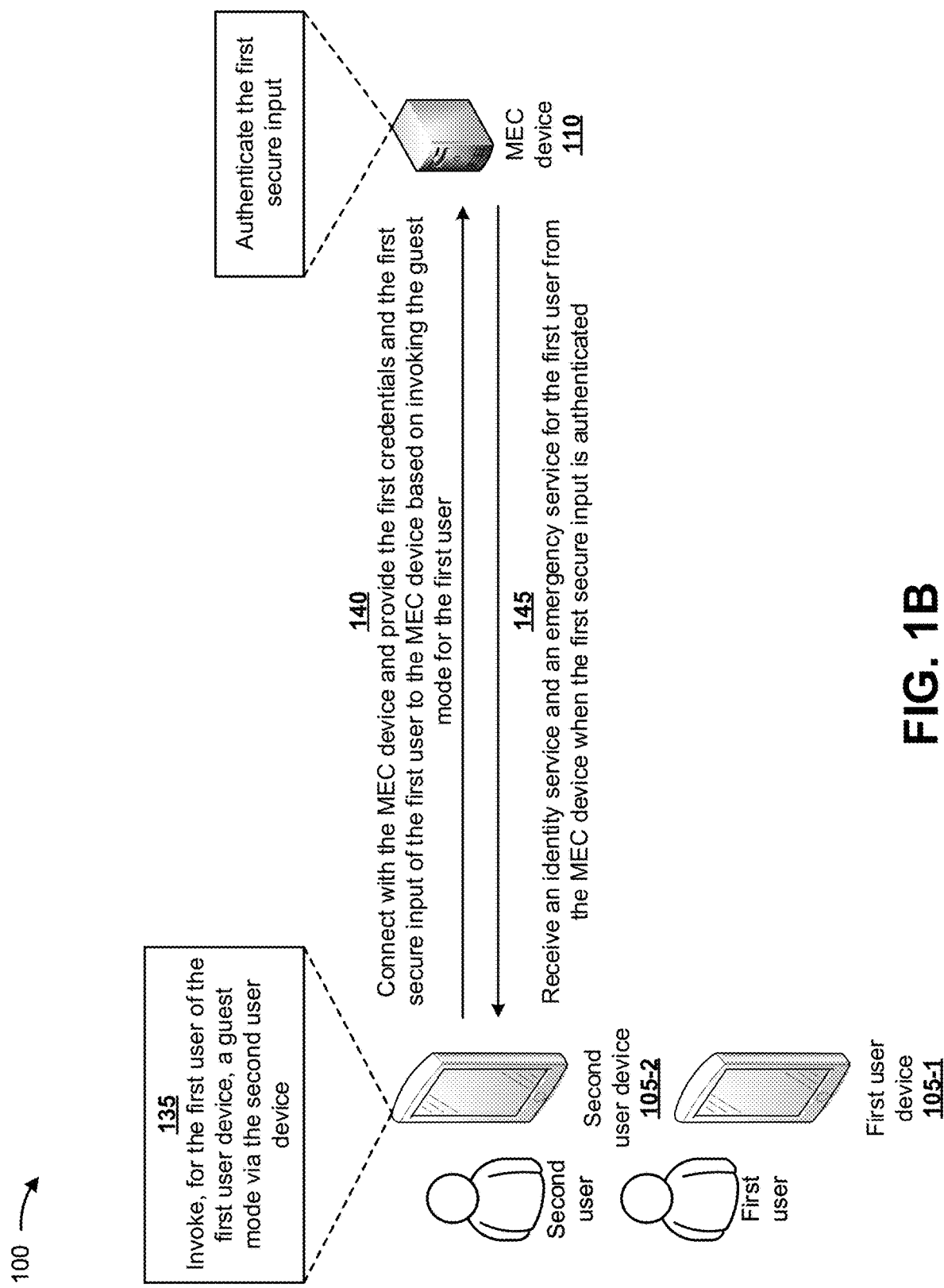

As shown in FIG. 1B, and by reference number 135, the second user device 105-2 may invoke, for the first user of the first user device 105-1, a guest mode via the second user device 105-2. For example, the first user or the second user may access an application of the second user device 105-2 that causes the second user device 105-2 to invoke the guest mode on behalf of the first user. The guest mode may enable the first user to utilize the second user device 105-2 to access identity services and/or emergency services provided by MEC device 110 while not allowing the first user to access any private information of the first user. The application may include a secure element to receive and transmit credentials and secure inputs provided via the application to prevent the second user from access to the first user's credentials and input.

As further shown in FIG. 1B, and by reference 140, the second user device 105-2 may connect with MEC device 110 and may provide the first credentials and the first secure input of the first user to MEC device 110 based on invoking the guest mode for the first user. For example, the application of the second user device 105-2 may request that the first user input the first credentials and the first secure input to the second user device 105-2, and the second user device 105-2 may receive the first credentials and the first secure input. The second user device 105-2 may connect with MEC device 110 based on establishing a telephone communication between the second user device 105-2 and MEC device 110. After establishing the telephone communication with MEC device 110, the second user device 105-2 may provide the first credentials and the first secure input of the first user to MEC device 110.

As further shown, MEC device 110 may authenticate the first secure input. For example, MEC device 110 may compare the first secure input received from the second user device 105-2 and the first secure input previously received from the first user device 105-1, as described in connection with FIG. 1A. If the first secure input received from the second user device 105-2 matches the previously received first secure input, MEC device 110 may authenticate the first secure input received from the second user device 105-2. If the first secure input received from the second user device 105-2 fails to match the previously received first secure input, MEC device 110 may not authenticate the first secure input received from the second user device 105-2.

As further shown in FIG. 1B, and by reference number 145, the second user device 105-2 may receive an identity service and an emergency service for the first user from MEC device 110 when the first secure input is authenticated by MEC device 110. The identity service may include a service that confirms an identity of the first user and enables provision of the emergency service. The emergency service may include a service to enable the first user to contact a person (e.g., contact an emergency list of people to inform the people that the first user is safe), a service to request an emergency response for the first user, a service to provide a location of the first user (e.g., to enable the first user to be rescued), and/or the like. In some implementations, the second user device 105-2 may receive, from MEC device 110, a message indicating that an identity of the first user cannot be confirmed, when the first secure input is not authenticated by MEC device 110. In such implementations, the second user device 105-2 may not receive the identity service and the emergency service for the first user.

As shown in FIG. 1C, and by reference number 150, the second user device 105-2 may associate, via the identity service, the first user with the second user device 105-2 to enable the first user to utilize the emergency service, and provide, via the emergency service, one or more emergency notifications. For example, the second user device 105-2 may utilize the identity service to confirm the identity of the first user and to associate the identity of the first user with the second user device 105-2. The identity service may also enable the first user to utilize the emergency service via the second user device 105-2. The one or more emergency notifications may include telephone calls, email messages, text messages, and/or the like. The second user device 105-2 may provide the one or more emergency notifications to a list of emergency contacts associated with the first user (e.g., to inform the contacts that the first user is safe), to request an emergency response for the first user, to provide a location of the first user (e.g., to enable the first user to be rescued), and/or the like.

As further shown in FIG. 1C, and by reference number 155, the second user device 105-2 may receive an indication of the first user exiting the guest mode and may remove the first credentials from a memory of the second user device 105-2. For example, when the first user is finished utilizing the identity service and the emergency service, the first user may provide, to the second user device 105-2, an input indicating that the first user wishes to exit the guest mode. In some implementations, the application of the second user device 105-2 may display a selection mechanism (e.g., a button, a link, and/or the like) that, when selected, causes the second user device 105-2 to receive the indication of the first user exiting the guest mode. The second user device 105-2 may exit the guest mode based on the indication and may remove the first credentials and/or the first secure input from the memory (e.g., the secure memory element in accessible to the second user) of second user device 105-2. In this way, the second user of the second user device 105-2 may not utilize the first credentials and/or the first secure input.

As further shown in FIG. 1C, and by reference number 160, the second user device 105-2 may provide, to MEC device 110, a signal indicating that the first credentials and/or the first secure input have been removed from the memory of second user device 105-2 based on the indication of the first user exiting the guest mode. For example, the second user device 105-2 may terminate the telephone communication between the second user device 105-2 and MEC device 110 and may provide, to MEC device 110, the signal indicating that the first credentials and/or the first secure input have been removed from the memory of second user device 105-2 based on the indication of the first user exiting the guest mode.

Figure 1D:
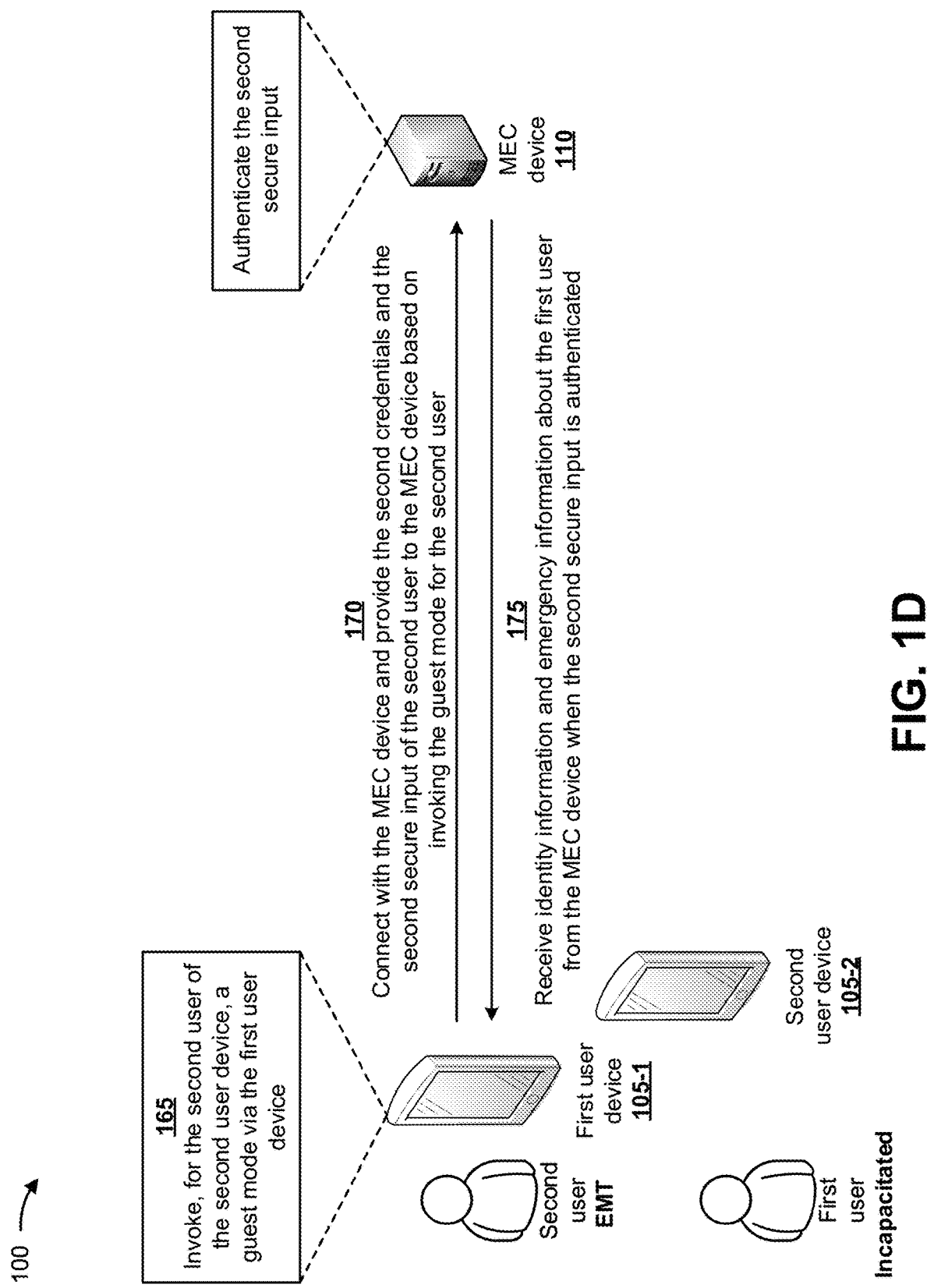

As shown in FIG. 1D, a first user associated with the first user device 105-1 may be an incapacitated (e.g., unable to speak, unconscious, and/or the like) person, and a second user associated with the second user device 105-2 may be an EMT attempting to help the incapacitated person. In some implementations, the second user may include a legally appointed medical surrogate of the first user, a guardian of the first user, a next of kin of the first user, school or team medical personnel associated with the first user, and/or the like. In some implementations, the first user device 105-1 may be locked, but a guest mode may still be accessed even though the first user device 105-1 is locked.

As further shown in FIG. 1D, and by reference number 165, the first user device 105-1 may invoke, for the second user of the second user device 105-2, a guest mode via the first user device 105-1. For example, the second user may access an application of the first user device 105-1 that causes the first user device 105-1 to invoke the guest mode on behalf of the second user. The guest mode may enable the second user to utilize the first user device 105-1 to access identity services and/or emergency services provided by MEC device 110. The application may include a secure element to receive and transmit credentials and secure inputs provided via the application.

As further shown in FIG. 1D, and by reference 170, the first user device 105-1 may connect with MEC device 110 and may provide the second credentials and the second secure input of the second user to MEC device 110 based on invoking the guest mode for the second user. For example, the application of the first user device 105-1 may request that the second user input the second credentials and the second secure input to the first user device 105-1, and the first user device 105-1 may receive the second credentials and the second secure input. The first user device 105-1 may connect with MEC device 110 based on establishing a telephone communication between the first user device 105-1 and MEC device 110. After establishing the telephone communication with MEC device 110, the first user device 105-1 may provide the second credentials and the second secure input of the second user to MEC device 110.

As further shown, MEC device 110 may authenticate the second secure input. For example, MEC device 110 may compare the second secure input received from the first user device 105-1 and the second secure input previously received from the second user device 105-2, as described in connection with FIG. 1A. If the second secure input received from the first user device 105-1 matches the previously received second secure input, MEC device 110 may authenticate the second secure input received from the first user device 105-1. If the second secure input received from the first user device 105-1 fails to match the previously received second secure input, MEC device 110 may not authenticate the second secure input received from the first user device 105-1.

As further shown in FIG. 1D, and by reference number 175, the first user device 105-1 may receive (e.g., and store in a secure memory element) identity information and an emergency information about the first user from MEC device 110 when the second secure input is authenticated by MEC device 110. The identity information may include information identifying the first user, such as a name of the first user, an age of the first user, an address of the first user, and/or the like. The emergency information may include information identifying vital signs of the first user, a medical record of the first user, a medical history of the first user, medications taken by the first user, and/or the like. In some implementations, the first user device 105-1 may receive, from MEC device 110, a message indicating that an identity of the second user cannot be confirmed, when the second secure input is not authenticated by MEC device 110. In such implementations, the first user device 105-1 may not receive the identity information and the emergency information about the first user.

Figure 1E:
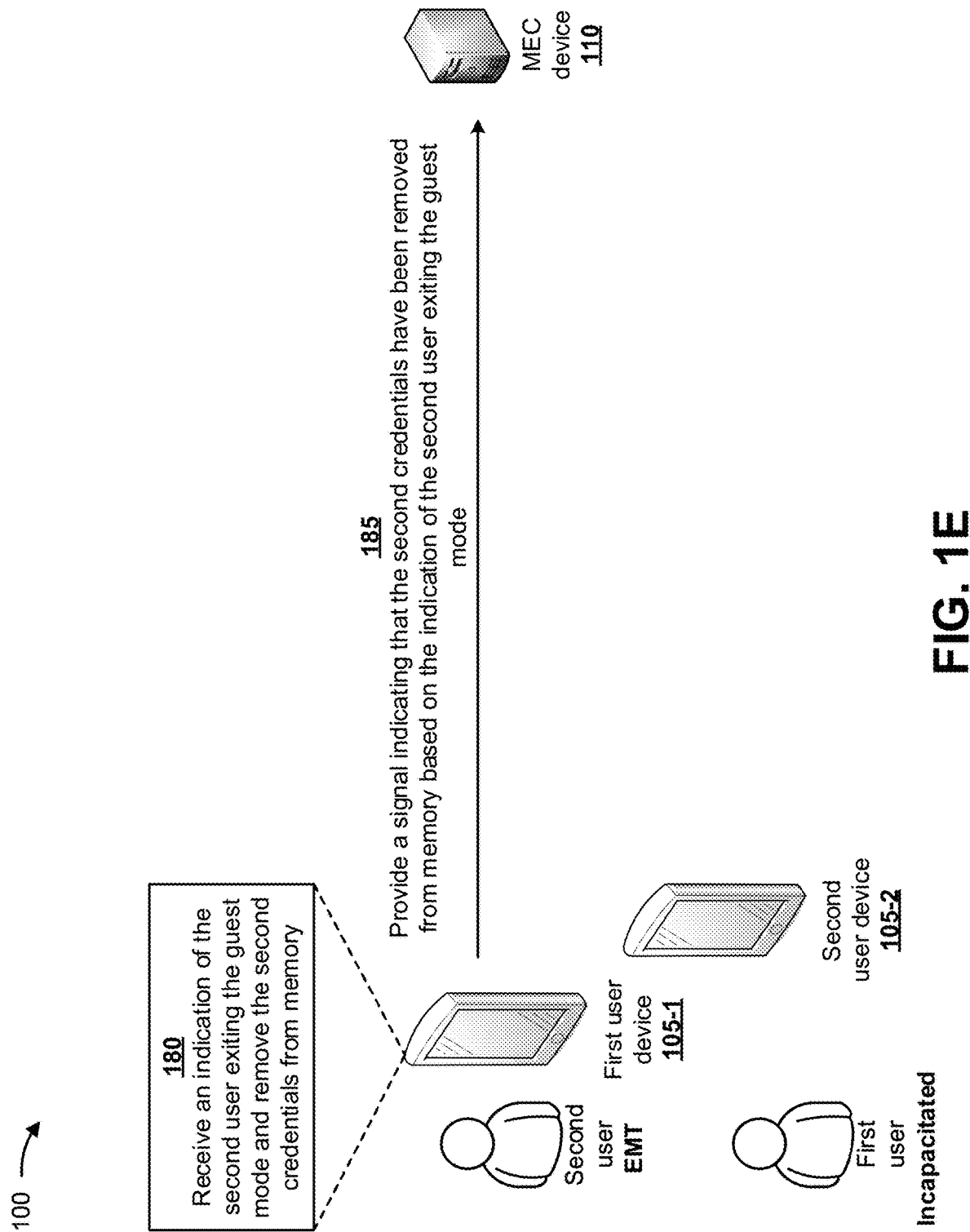

As shown in FIG. 1E, and by reference number 180, the first user device 105-1 may receive an indication of the second user exiting the guest mode and may remove the second credentials from a memory of the first user device 105-1. For example, when the second user is finished utilizing the identity information and the emergency information, the second user may provide, to the first user device 105-1, an input indicating that the second user wishes to exit the guest mode. In some implementations, the application of the first user device 105-1 may display a selection mechanism (e.g., a button, a link, and/or the like) that, when selected, causes the first user device 105-1 to receive the indication of the second user exiting the guest mode. The first user device 105-1 may exit the guest mode based on the indication and may remove the second credentials and/or the second secure input from the memory of first user device 105-1. In this way, the first user of the first user device 105-1 may not utilize the second credentials and/or the second secure input.

As further shown in FIG. 1E, and by reference number 185, the first user device 105-1 may provide, to MEC device 110, a signal indicating that the second credentials and/or the second secure input have been removed from the memory of first user device 105-1 based on the indication of the second user exiting the guest mode. For example, the first user device 105-1 may terminate the telephone communication between the first user device 105-1 and may provide, to MEC device 110, a signal indicating that the second credentials and/or the second secure input have been removed from the memory of first user device 105-1 based on the indication of the second user exiting the guest mode.

Figure 1F:
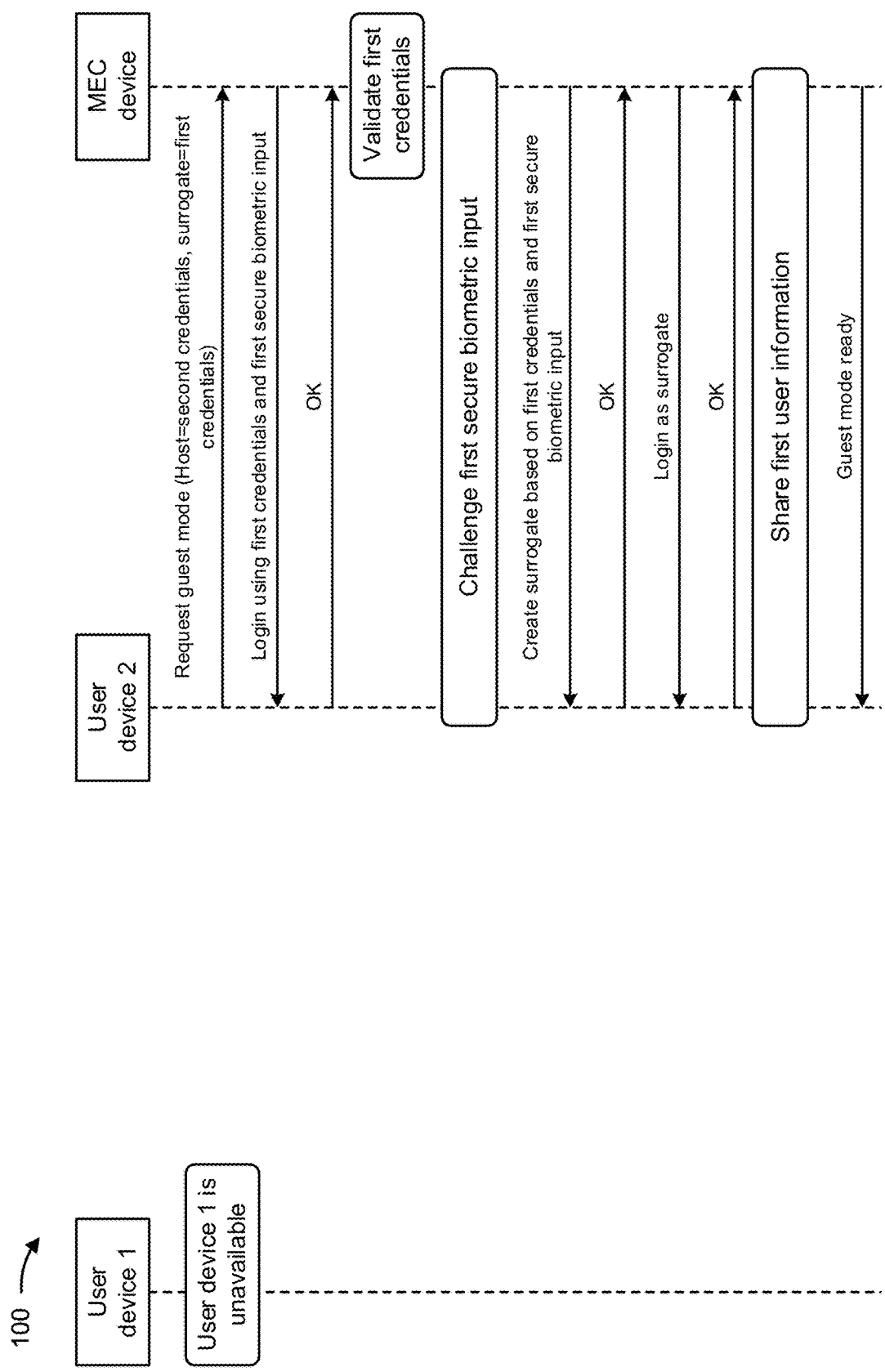

FIG. 1F is a call flow diagram associated with surrogate credentialing by the first user via the second user device 105-2. As shown, the first user device 105-1 of the first user may be unavailable, and the first user may utilize the second user device 105-2 to request the guest mode from MEC device 110. The request for the guest mode may include the second credentials of the second user of the second user device 105-2 and the first credentials of the first user. MEC device 110 may instruct the first user, via the second user device 105-2, to login to the guest mode using the first credentials and the first secure biometric input. The first user may cause the second user device 105-2 to provide the first credentials and the first secure biometric input to MEC device 110, and MEC device 110 may validate the first credentials.

As further shown in FIG. 1F, MEC device 110 may challenge the first secure biometric input via the second user device 105-2, and may request the second user device 105-2 to create a surrogate for the first user based on the first credentials and the first secure biometric input. The second user device 105-2 may create the surrogate for the first user, and MEC device 110 may request the first user, via the second user device 105-2, to login as the surrogate. The first user may utilize the second user device 105-2 to login as the surrogate, and MEC device 110 may share the first user information with the second user device 105-2. At this point, the guest mode may be ready to be utilized by the first user, via the second user device 105-2.

Figure 1G:
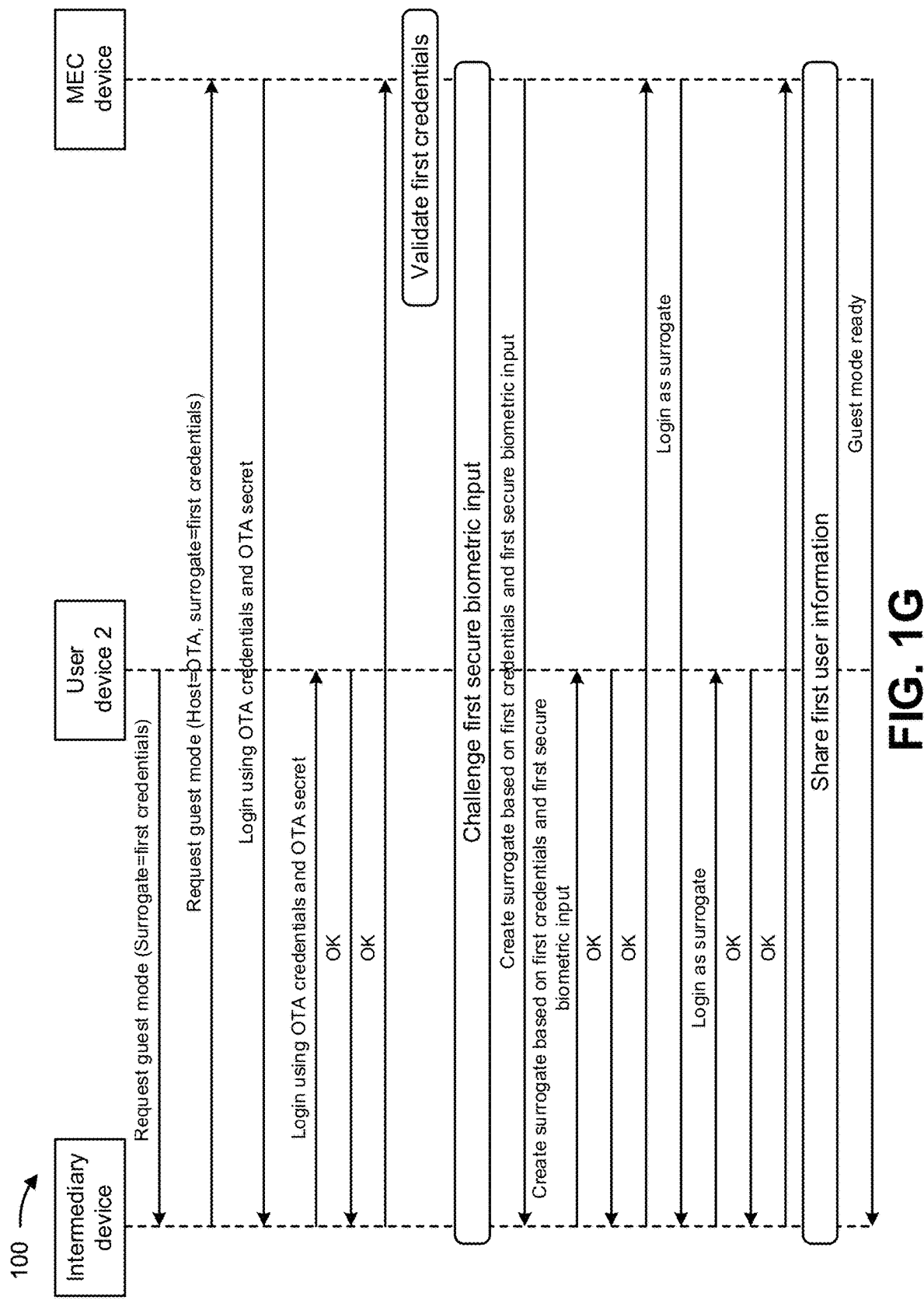

FIG. 1G is a call flow diagram associated with surrogate credentialing by the first user via the second user device 105-2 and an intermediary device (e.g., a proxy server, a customer care server, and/or the like). As shown, the second user device 105-2 may request the guest mode from the intermediary device based on the first credentials as the surrogate credentials. The intermediary device may request the guest mode from MEC device 110 based on an over-the-air (OTA) identifier of the intermediary device and the first credentials as the surrogate credentials. MEC device 110 may instruct the intermediary device to login using credentials of the intermediary device (e.g., OTA credentials) and a secret associated with the intermediary device (e.g., an OTA secret). The intermediary device may instruct the second user device 105-2 to login using the OTA credentials and the OTA secret. The second user device 105-2 may login to the intermediary device based on the OTA credentials and the OTA secret, and the intermediary device may login to MEC device 110 based on the OTA credentials and the OTA secret.

As further shown in FIG. 1G, MEC device 110 may validate the first credentials, and may challenge the first secure biometric input via the intermediary device. MEC device 110 may request the intermediary device to create a surrogate for the first user based on the first credentials and the first secure biometric input, and the intermediary device may request the second device 105-2 to create the surrogate for the first user based on the first credentials and the first secure biometric input. The second user device 105-2 may create the surrogate for the first user based on the first credentials and the first secure biometric input, and MEC device 110 may request the intermediary device to login as the surrogate. The intermediary device may request the first user to utilize the second user device 105-2 to login as the surrogate. The first user may utilize the second user device 105-2 to login as the surrogate, and MEC device 110 may share the first user information with the intermediary device. At this point, the guest mode may be ready to be utilized by the first user, via the intermediary device and the second user device 105-2.

In this way, the systems and/or methods described herein may enable a secure guest mode on user device 105 to convey surrogate credentials so that a user may receive identity services and/or emergency services. User device 105 may invoke, for a user associated with an unavailable user device 105, a guest mode for the user, and may connect with MEC device 110 based on invoking the guest mode. User device 105 may provide credentials of the user and a secure input of the user to MEC device 110 based on invoking the guest mode, and may receive, from MEC device 110, an identity service and an emergency service for the user when the secure input is authenticated by MEC device 110. User device 105 may associate, via the identity service, the user with user device 105 to enable the user to utilize the emergency service, and may provide, via the emergency service, one or more emergency notifications. This, in turn, conserves computing resources, networking resources, and/or the like that would otherwise have been wasted in determining identities and emergency precautions of users during emergency situations, locating missing users during disaster situations, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
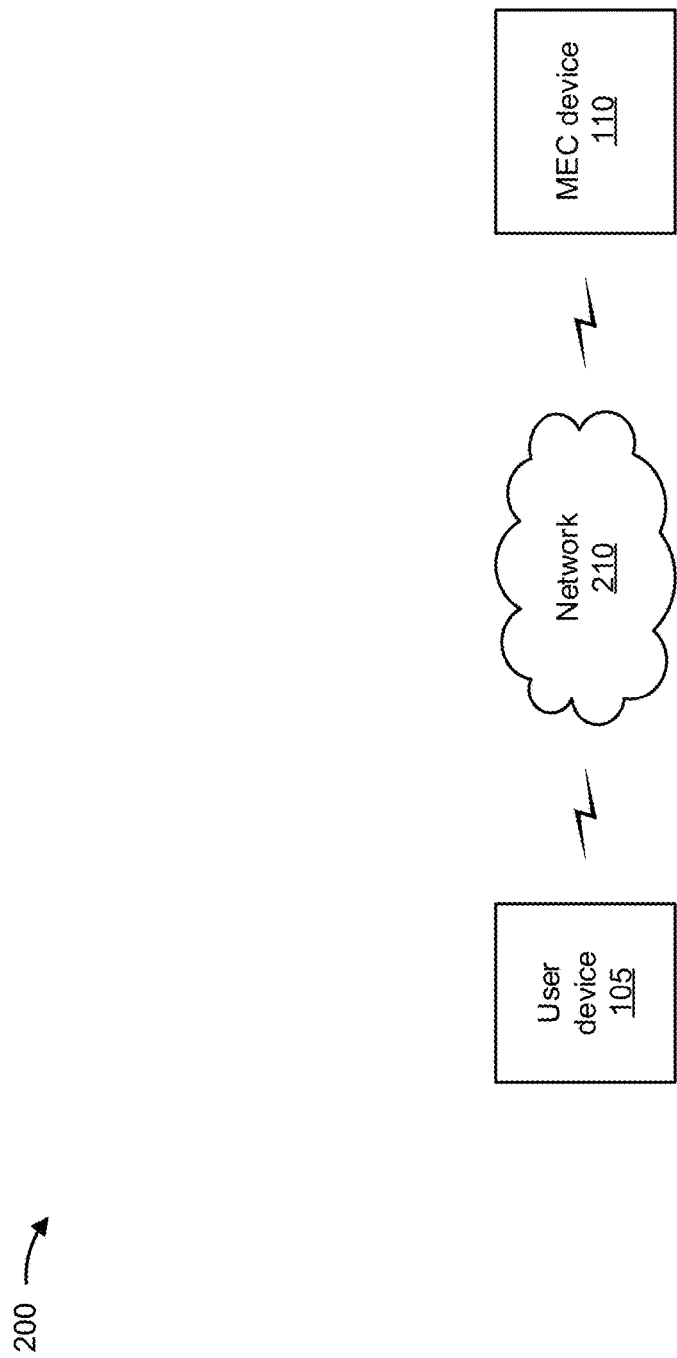
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, MEC device 110, and/or a network 210. Devices and/or elements of environment 200 may interconnect via wired connections and/or wireless connections.

User device 105 includes one or more devices capable of receiving, generating, storing, processing, and/or providing information associated with authenticating surrogate credentials and providing a secure guest mode, as described elsewhere herein. User device 105 may include a communication device and/or a computing device. For example, user device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 105 may communicate with one or more other devices of environment 200, as described elsewhere herein.

MEC device 110 includes one or more devices capable of receiving, generating, storing, processing, providing, and/or routing information associated with authenticating surrogate credentials and providing a secure guest mode for user device 105, as described elsewhere herein. MEC device 110 may include a communication device and/or a computing device. For example, MEC device 110 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. MEC device 110 may communicate with one or more other devices of environment 200, as described elsewhere herein.

Network 210 includes one or more wired and/or wireless networks. For example, network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
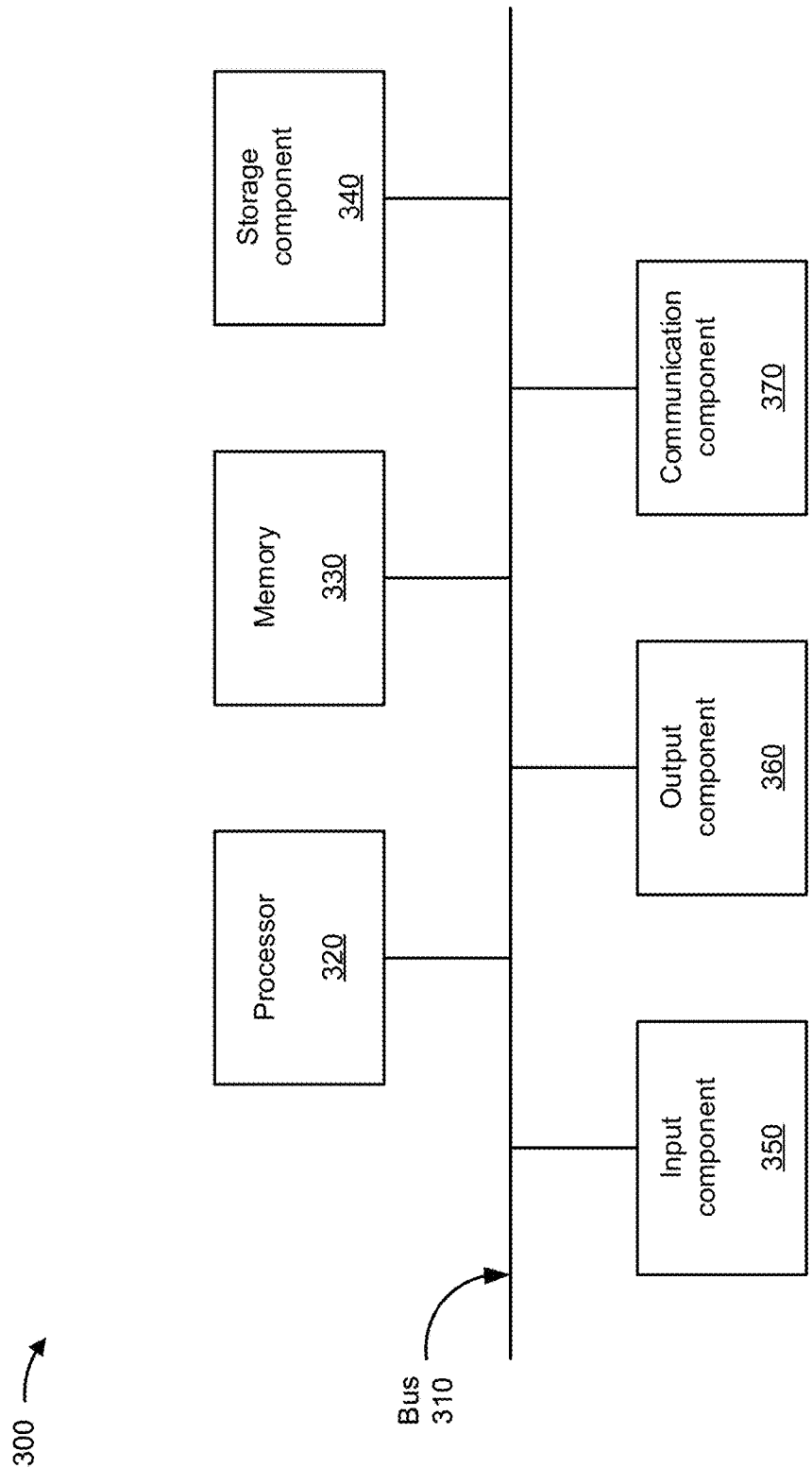
FIG. 3 is a diagram of example components of one or more devices of FIG. 2.

FIG. 3 is a diagram of example components of a device 300, which may correspond to user device 105 and/or MEC device 110. In some implementations, user device 105 and/or MEC device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with providing surrogate credentials and a secure guest mode for mobile devices. In some implementations, one or more process blocks of FIG. 4 may be performed by a device (e.g., the first user device 105-1 or the second user device 105-2). In some implementations, one or more process blocks of FIG. 4 may be performed by another device or a group of devices separate from or including the device, such as a network device (e.g., MEC device 110). Additionally, or alternatively, one or more process blocks of FIG. 4 may be performed by one or more components of device 300, such as processor 320, memory 330, storage component 340, input component 350, output component 360, communication component 370, and/or the like.

As shown in FIG. 4, process 400 may include invoking, for a user associated with an unavailable user device, a guest mode for the user via the user device (block 410). For example, the user device may invoke, for a user associated with an unavailable user device, a guest mode for the user via the user device, as described above.

As further shown in FIG. 4, process 400 may include connecting the user device with a network device based on invoking the guest mode for the user (block 420). For example, the user device may connect the user device with a network device based on invoking the guest mode for the user, as described above.

As further shown in FIG. 4, process 400 may include providing credentials of the user and a secure input of the user to the network device based on invoking the guest mode for the user (block 430). For example, the user device may provide credentials of the user and a secure input of the user to the network device based on invoking the guest mode for the user, as described above.

As further shown in FIG. 4, process 400 may include receiving, from the network device, an identity service for the user when the secure input is authenticated by the network device (block 440). For example, the user device may receive, from the network device, an identity service for the user when the secure input is authenticated by the network device, as described above.

As further shown in FIG. 4, process 400 may include associating, via the identity service, the user with the user device (block 450). For example, the user device may associate, via the identity service, the user with the user device, as described above.

As further shown in FIG. 4, process 400 may include receiving an indication of the user exiting the guest mode (block 460). For example, the user device may receive an indication of the user exiting the guest mode, as described above.

As further shown in FIG. 4, process 400 may include removing the credentials of the user from a memory of the user device based on the indication of the user exiting the guest mode (block 470). For example, the user device may remove the credentials of the user from a memory of the user device based on the indication of the user exiting the guest mode, as described above.

As further shown in FIG. 4, process 400 may include providing, to the network device, a signal indicating that the credentials of the user have been removed from the memory, based on the indication of the user exiting the guest mode (block 490). For example, the user device may provide, to the network device, a signal indicating that the credentials of the user have been removed from the memory, based on the indication of the user exiting the guest mode, as described above.

Process 400 may include additional implementations, such as any single implementation or any combination of implementations described below and/or in connection with one or more other processes described elsewhere herein.

In a first implementation, the secure input includes a personal identification number (PIN), a password, or a biometric input.

In a second implementation, alone or in combination with the first implementation, the guest mode includes a secure environment that receives guest user credentials and provides private information or communication for each guest user.

In a third implementation, alone or in combination with one or more of the first and second implementations, process 400 includes requesting the secure input, and receiving the secure input from the user based on requesting the secure input.

In a fourth implementation, alone or in combination with one or more of the first through third implementations, the network device includes one of a cloud-based device, or a multi-access edge computing device.

In a fifth implementation, alone or in combination with one or more of the first through fourth implementations, the identity service includes a service to enable the user to contact a person, a service to request an emergency response, or a service to provide a location of the user.

In a sixth implementation, alone or in combination with one or more of the first through fifth implementations, process 400 includes providing, to the network device, another secure input, associated with another user of the user device, and user information associated with the other user, receiving, from the network device, other credentials of the other user based on providing the other secure input and the user information, and storing the other credentials in the memory.

In a seventh implementation, alone or in combination with one or more of the first through sixth implementations, alone or in combination with the first implementation, the emergency information includes information identifying a vital sign of a person, a medical record of the person, a medical history of the person, or medications taken by the person.

In an eighth implementation, alone or in combination with one or more of the first through seventh implementations, process 400 includes receiving emergency information about the person, and providing the emergency information to the network device.

In a ninth implementation, alone or in combination with one or more of the first through eighth implementations, connecting the user device with the network device includes connecting the user device with the network device based on establishing a telephone communication between the user device and the network device.

In a tenth implementation, alone or in combination with one or more of the first through ninth implementations, process 400 includes requesting the secure input, and receiving the secure input from the user based on requesting the secure input.

In an eleventh implementation, alone or in combination with one or more of the first through tenth implementations, process 400 includes requesting the credentials, and receiving the credentials from the user based on the requesting the credentials.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   invoking, by a first user device of a first user and for a second user associated with a second user device, a guest mode for the first user via the second user device, wherein the guest mode prevents the second user from accessing information that is associated with the first user and is stored on the first user device;
   connecting the first user device with a network device based on invoking the guest mode for the second user;
   providing, by the first user device, credentials of the second user and a secure input of the second user to the network device based on invoking the guest mode for the second user;
   receiving, by the first user device and from the network device, an identity service for the second user when the secure input is authenticated by the network device;
   associating, by the first user device and via the identity service, the second user with the first user device;
   receiving, by the first user device, an indication of the second user exiting the guest mode;
   removing, by the first user device, the credentials of the second user from a memory of the first user device based on the indication of the second user exiting the guest mode; and
   providing, by the first user device and to the network device, a signal indicating that the credentials of the second user have been removed from the memory, based on the indication of the second user exiting the guest mode.

2. The method of claim 1, wherein the secure input includes one or more of:
   a personal identification number (PIN),
   a password, or
   a biometric input.

3. The method of claim 1, wherein the guest mode includes a secure environment that receives guest user credentials and provides private information or communication for each guest user.

4. The method of claim 1, further comprising:
   requesting the secure input; and
   receiving the secure input from the second user based on requesting the secure input.

5. The method of claim 1, wherein the network device includes one of:
   a cloud-based device, or
   a multi-access edge computing device.

6. The method of claim 1, wherein the identity service includes one or more of:
   a service to enable the second user to contact a person,
   a service to request an emergency response, or
   a service to provide a location of the second user.

7. The method of claim 1, further comprising:
   providing, to the network device, another secure input, associated with another user of the first user device, and user information associated with the other user;
   receiving, from the network device, other credentials of the other user based on providing the other secure input and the user information; and
   storing the other credentials in the memory.

8. A user device, comprising:
   one or more processors configured to:
   invoke, on behalf of a first user associated with the user device, a guest mode for a second user via the user device,
      wherein the guest mode prevents the second user from accessing information that is associated with the first user and is stored on the user device;
   connect the user device with a network device based on invoking the guest mode for the second user;
   provide credentials of the second user and a secure input of the second user to the network device based on invoking the guest mode for the second user;
   receive, from the network device, emergency information about the first user when the secure input is authenticated by the network device,
      wherein the emergency information about the first user is temporarily available via the guest mode;
   receive an indication of the second user exiting the guest mode;
   remove the credentials of the second user from a memory of the user device based on the indication of the second user exiting the guest mode; and
   provide, to the network device, a signal indicating that the credentials of the second user have been removed from the memory, based on the indication of the second user exiting the guest mode.

9. The user device of claim 8, wherein the network device includes one of:
   a cloud-based device, or
   a multi-access edge computing device.

10. The user device of claim 8, wherein the emergency information includes information identifying one or more of:
    a vital sign of the second user,
    a medical record of the second user,
    a medical history of the second user, or
    medications taken by the second user.

11. The user device of claim 8, wherein the one or more processors are further configured to:
    receive the emergency information about the second user; and
    provide the emergency information to the network device.

12. The user device of claim 8, wherein the one or more processors, when connecting the user device with the network device, are configured to:
    connect the user device with the network device based on establishing a telephone communication between the user device and the network device.

13. The user device of claim 8, wherein the one or more processors are further configured to:
  request the secure input; and
  receive the secure input from the second user based on requesting the secure input.

14. The user device of claim 8, wherein the one or more processors are further configured to:
  request the credentials; and
  receive the credentials from the second user based on the requesting the credentials.

15. A non-transitory computer-readable medium storing a set of instructions, the set of instructions comprising:
  one or more instructions that, when executed by one or more processors of a first user device associated with a first user, cause the first user device to:
    receive, from a second user associated with a second user device, a request to invoke a guest mode for the second user via the first user device,
      wherein the guest mode prevents the second user from accessing information that is associated with the first user and is stored on the first user device;
    invoke the guest mode for the second user based on the request to invoke the guest mode;
    connect the first user device with a network device based on invoking the guest mode for the second user;
    request credentials of the second user and a secure input of the second user based on invoking the guest mode for the second user;
    receive the credentials and the secure input based on requesting the credentials of the second user and the secure input of the second user;
    provide the credentials and the secure input to the network device based on invoking the guest mode for the second user;
    receive, from the network device, an identity service and an emergency service for the second user when the secure input is authenticated by the network device;
    associate, via the identity service, the second user with the first user device to enable the second user to utilize the emergency service;
    provide, via the emergency service, one or more emergency notifications;
    receive an indication of the second user exiting the guest mode;
    remove the credentials of the second user from a memory of the first user device based on the indication of the second user exiting the guest mode; and
    provide, to the network device, a signal indicating that the credentials have been removed from the memory, based on the indication of the second user exiting the guest mode.

16. The non-transitory computer-readable medium of claim 15, wherein the one or more instructions, that cause the first user device to connect the user device with the network device, cause the first user device to:
  connect the first user device with the network device based on establishing a telephone communication between the first user device and the network device.

17. The non-transitory computer-readable medium of claim 15, wherein the secure input includes one or more of:
  a personal identification number (PIN),
  a password, or
  a biometric input.

18. The non-transitory computer-readable medium of claim 15, wherein the credentials include one or more of:
  a username associated with the second user,
  a telephone number associated with the second user device, or
  an account number associated with the second user.

19. The non-transitory computer-readable medium of claim 15, wherein the emergency service includes one or more of:
  a service to enable the second user to contact a relative,
  a service to request an emergency response, or
  a service to provide a location of the second user.

20. The non-transitory computer-readable medium of claim 15, wherein the one or more instructions further cause the first user device to:
  provide, to the network device, another secure input, associated with another user of the first user device, and user information associated with the other user;
  receive, from the network device, other credentials of the other user based on providing the other secure input and the user information; and
  store the other credentials in the memory.

\* \* \* \* \*